(12) United States Patent
Jones et al.

(10) Patent No.: US 9,075,713 B2
(45) Date of Patent: Jul. 7, 2015

(54) METHOD FOR DETECTING ANOMALIES IN MULTIVARIATE TIME SERIES DATA

(75) Inventors: Michael Jeffrey Jones, Belmont, MA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 307 days.

(21) Appl. No.: 13/480,215

(22) Filed: May 24, 2012

(65) Prior Publication Data

US 2013/0318011 A1     Nov. 28, 2013

(51) Int. Cl.
| | |
|---|---|
| G06F 11/07 | (2006.01) |
| G06K 9/62 | (2006.01) |
| G06N 99/00 | (2010.01) |
| G05B 23/02 | (2006.01) |

(52) U.S. Cl.
CPC ............ *G06F 11/07* (2013.01); *G06K 9/6256* (2013.01); *G06N 99/005* (2013.01); *G05B 23/02* (2013.01)

(58) Field of Classification Search
CPC .... G06N 99/005; G06K 9/6256; G06F 11/07; G05B 23/02
USPC .......................................................... 706/12
See application file for complete search history.

(56) References Cited

U.S. PATENT DOCUMENTS

| | | | | |
|---|---|---|---|---|
| 4,567,610 | A * | 1/1986 | McConnell | 382/170 |
| 5,764,509 | A | 6/1998 | Gross | |
| 6,181,975 | B1 | 1/2001 | Gross | |
| 7,103,222 | B2 * | 9/2006 | Peker | 382/181 |

OTHER PUBLICATIONS

Cheng et al., Detection and Characterization of Anomalies in Multivariate Time Series, Proceedings of the SIAM International Conference on Data Mining, SDM 2009, Apr. 30-May 2, 2009.*
Chandola, Anomaly Detection for Symbolic Sequences and Time Series Data, University of Minnesota, Sep. 2009.*
Guha et al., Data-Streams and Histograms, STOC'01, Jul. 6-8, 2001.*
Brown, Failure Rate Modeling Using Equipment Inspection Data, IEEE Power Engineering Society General Meeting, 2004.*
Kind et al., Histogram-Based Traffice Anomaly Detection, IEEE Transactions on Network Service Management, vol. 6, No. 2, Jun. 2009.*
Liu et al., Novel Online Methods for Time Series Segmentation, IEEE Transactions on Knowledge and Data Engineering, vol. 20, No. 12, Dec. 2008.*
Muthukrishnan et al., Mining Deviants in Time Series Data Streams, Proc. of VLDB, 1999.*
Fu, A Review on Time Series Data Mining, Engineering Applications of Artifical Intelligence, vol. 24, pp. 164-181, Feb. 2011.*

(Continued)

*Primary Examiner* — Lut Wong
*Assistant Examiner* — Robert H Bejcek, II
(74) *Attorney, Agent, or Firm* — Dirk Brinkman; Gene Vinokur

(57) ABSTRACT

A method detects anomalies in time series data, wherein the time series data is multivariate, by partitioning time series training data into partitions. A representation for each partition in each time window is determined to form a model of the time series training data, wherein the model includes representations of distributions of the time series training data. The representations obtained from partitions of time series test data are compared to the model to obtain anomaly scores.

4 Claims, 3 Drawing Sheets

(56) References Cited

OTHER PUBLICATIONS

Chandola et al., Outlier Detection: A Survey, University of Minnesota, 83 pages, 2007.*

Kumaran et al., Wavelet Decomposition of the Blink Reflex R2 Component Enables Improved Discrimination of Multiple Sclerosis, Clinical Neurophysiology vol. 111, p. 810-820, 2000.*

Rajasegarar et al., Anomally Detection in Wireless Sensor Networks, IEEE Wireless Communications, p. 34-40, Aug. 2008.*

Subbu, Pattern Recognition Using Symbolic Dynamic Filtering, Pennsylvania State University, 194 pages, 2009.*

Tuckerman, Phase Space Distribution Functions and Liouville's Theorem, http://www.nyu.edu/classes/tuckerman/stat.mech/lectures/lecture_1/node7.html, 4 pages, 2003.*

Huber et al., Variance Stabilization Applied to Microarray Data Calibration and to the Quantification of Differential Expression, BioInformatics vol. 18 Suppl. 1, p. S96-S104, 2002.*

* cited by examiner

300

METHOD FOR DETECTING ANOMALIES IN MULTIVARIATE TIME SERIES DATA

FIELD OF THE INVENTION

This invention relates generally to processing time series data, and more particularly to determine anomalies during operation of equipment from time series data acquired by sensors.

BACKGROUND OF THE INVENTION

Equipment monitoring can avoid costly repairs. This can be done by analyzing time series data acquired by sensors. One method treats each multivariate data point at time t independently. That method does not use sliding windows over time. Because that method does not analyze data in time windows, the method cannotdetect "collective anomalies," which are anomalies in the dynamics of a variable, i.e., changes over time. That method does not compute any feature vectors, or representation of the data. The method simply compares raw time series test data with raw training data.

Another method assumes multivariate time series can be modeled locally as a vector autoregressive (AR) model. This is a fairly restrictive assumption. That method first learns a distribution of AR model parameters for each time window of the training data. During testing, for each time window, the AR model parameters are estimated and the probability of these parameters are computed from the previously learned probability distribution. The distribution learned by that method uses a restrictive autoregressive assumption.

SUMMARY OF THE INVENTION

A method detects anomalies in time series data, wherein the time series data is multivariate, by partitioning time series training data into partitions.

A representation for each partition in each time window is determined to form a model of the time series training data, wherein the model includes representations of distributions of the time series training data.

The representations obtained from partitions of time series test data are compared to the model to obtain anomaly scores.

DETAILED DESCRIPTION OF THE PREFERRED EMBODIMENTS

The embodiments of our invention provide a method for detecting anomalies in multivariate time series data. Specifically, time series data acquired by sensors of equipment. Multivariate time series arise in many different applications. We are particularly interested in monitoring equipment condition.

Equipment condition monitoring is the process of analyzing signals from various sensors attached to equipment, such as pumps, condensors, fans, etc., to determine if the equipment is operating normally, or not. The sensors, such as vibration sensors, pressure sensors, temperature sensors, etc., output a series of sensor data, which is called a time series. When data from multiple sensor are available, the time series is a multivariate time series. Each dimension of the multivariate time series contains data from one sensor.

The goal of equipment monitoring is to analyze the time series data from equipment sensors to automatically detect if the equipment has failed, or, perhaps, will soon fail.

The basic strategy for accomplishing this is to first construct a model of the time series data during normal operation. Then, detecting equipment failures, or impending failures, is performed by detecting anomalies in the time series test data, which are differences from the time series training data acquired during normal operation.

Method for Detecting Anomalies in Multivariate Time Series

Figure 1:
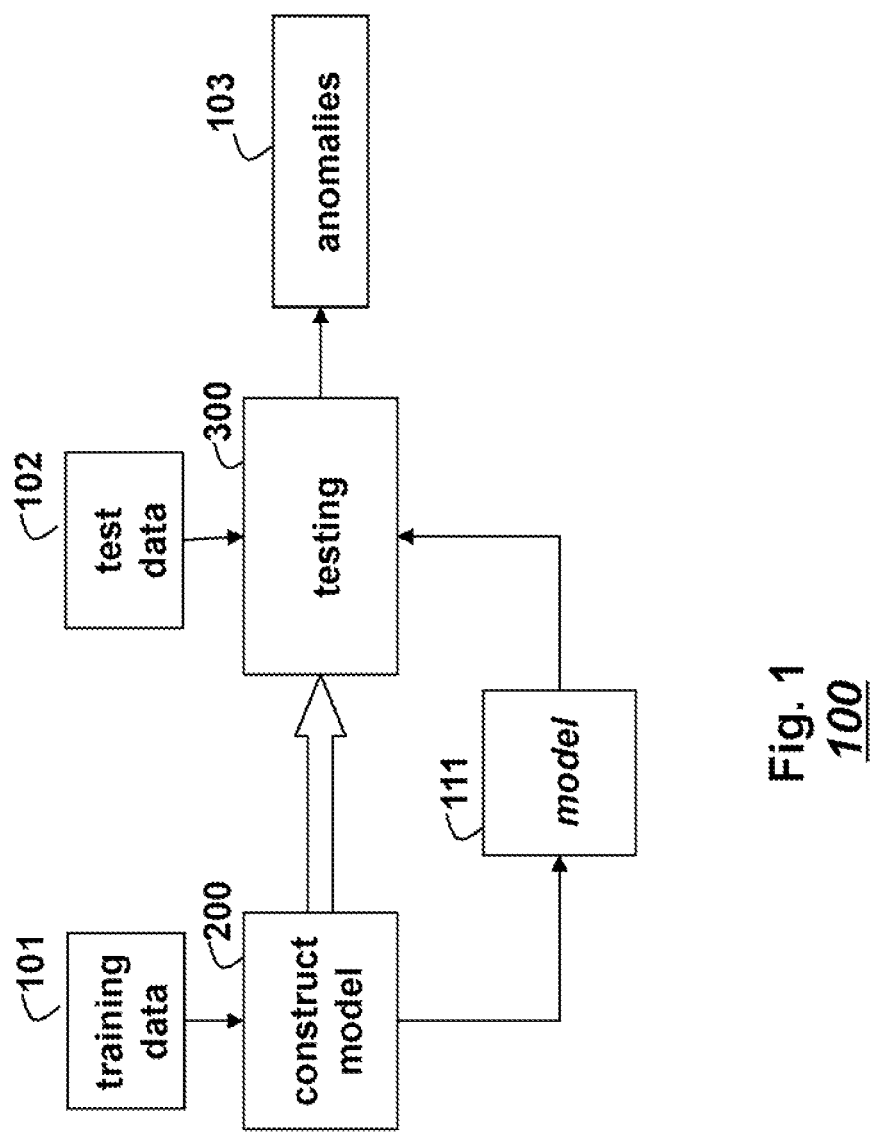
FIG. 1 is a flow diagram of a method for detecting anomalies in time series data according to embodiments of the invention.

As shown in FIG. 1, our method 100 of detecting anomalies 103 in multivariate time series data has two main phases: model 111 construction 200; and testing 300. For model construction, we use multivariate time series training data 101 acquired during normal operation. The model characterizes important aspects of the operation.

During testing 200, we acquire, e.g., real-time multivariate time series test data 102, and use the model to determine if the test data are anomalous by determining how well time windows in the test data are described by the model learned during the construction phase.

The steps of the method can be performed in a processor connected to memory and input/output interfaces as known in the art.

Model Construction Phase

Figure 2:
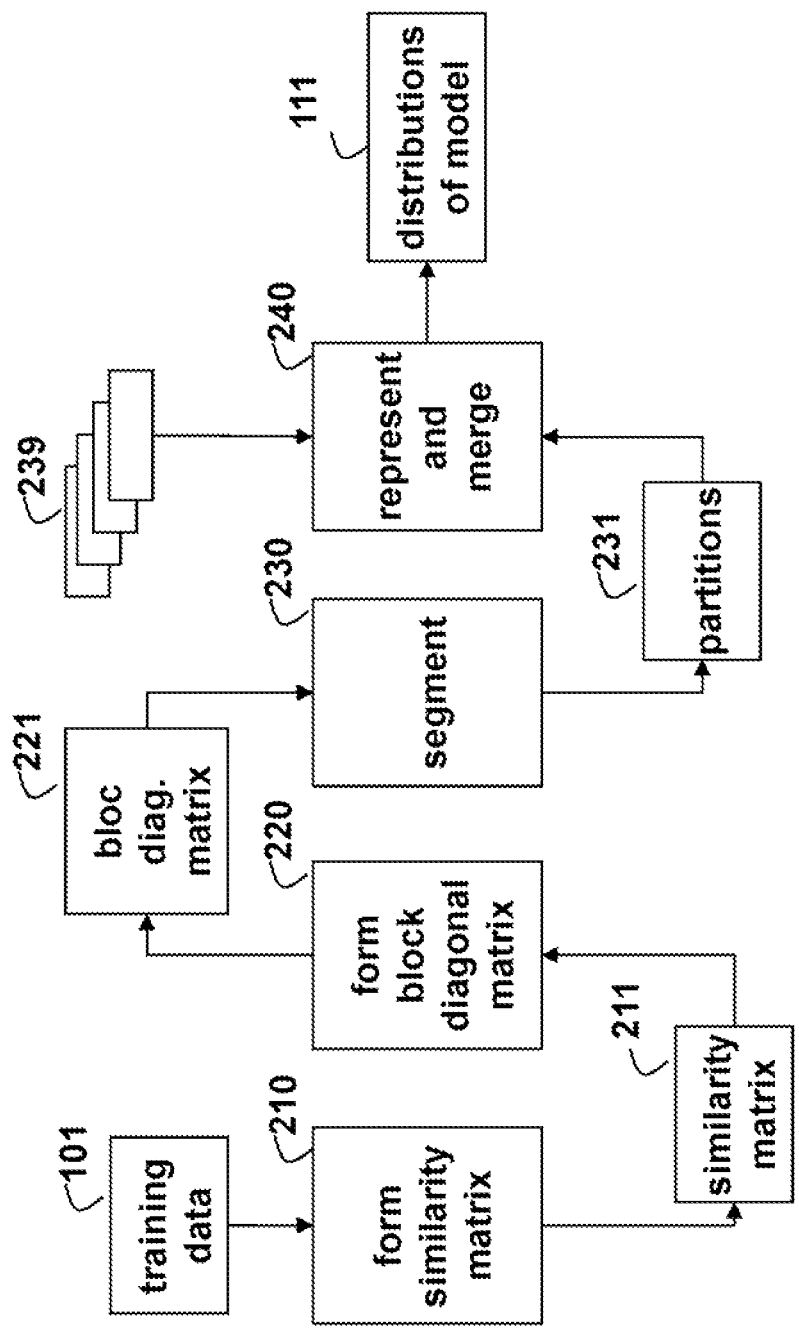
FIG. 2 is a flow diagram of a training phase of the method in FIG. 1.

As shown in FIG. 2, during model construction 200, pairs of variables from the multivariate time series training data are analyzed to determine which pairs, if any, are correlated. A variable represents a single dimension of the multivariate time series (i.e., the readings from a single sensor). The mutual information between variable i and j is determined as a measure of correlation between the variables.

Because there can be a time delay between two variables, an optimal time shift is searched so that the mutual information between variable i and the shifted version of variable j is maximized.

A similarity matrix 211 is formed 210, where entry i,j in the matrix stores the mutual information between variable i and a possible shifted version of variable j.

A reverse Cuthill-McKee procedure is then used to form 220 a block diagonal matrix 221 from the similarity matrix. The reverse Cuthill-McKee procedure permutes a sparse matrix that has a symmetric sparsity pattern into a band matrix form with a small bandwidth.

The blocks of the matrix are segmented 230 and the set of variables in each block define a partition 231. Every variable is in exactly one partition. A partition represents a set of variables (possibly of size 1) that have high mutual information.

After partitioning the variables of the multivariate time series data into correlated sets, each partition is treated as a separate and independent multivariate time series.

Each multivariate time series forming a partition is processed 240 using a sliding time window 239 of a predermined fixed length to construct the model 111. The time series data in the partitions have correlated dimensions. For each time window, various representations of the time series in the window can be computed.

These representations are all statistical distributions computed over one or more variables in the partition. There are five types of distributions that we can use. The distributions can be viewed as feature vectors of the time series data.

(1) One is a representation of the joint distribution of the time series values of variable $z_i$ and variable $z_j$ where both $z_i$ and $z_j$ are members of the partition. This joint distribution can be represented as a two-dimensional histogram. This representation is a "joint distribution of variables $z_i$ and $z_j$."

(2) The second type of representation is the joint distribution of z(t) and z(t+d) where z is a variable of the partition and d is a small positive integer. This joint distribution can be represented as a two-dimensional histogram. This representation is a "2D phase space distribution of variable z."

(3) The third type of representation is the joint distribution of z(t), z(t+d), and z(t+2d) where z is a variable of the partition and d is a small positive integer. This joint distribution can be represented as a three-dimensional histogram. This representation is a "3D phase space distribution of variable z."

(4) The fourth type of representation is the joint distribution of z(t), z(t+d) and the angles formed between (z(t), z(t+d)) and (z(t+d), z(t+2d)) where z is a variable of the partition and d is a small positive integer. This joint distribution can be represented as a three-dimensional histogram. This representation is a "phase space angle distribution of variable z."

(5) The fifth type of representation is the distribution of differences between a variable z at time t and the same variable z at time t+d. This distribution can be represented as a one dimensional histogram. This representation is a "difference distribution of variable z."

During the model construction 200, the set of distributions of the types described above are computed for each time window. Because time windows substantially overlap, and because the training time series is very similar at different times, many of the representations computed for different time windows are similar. The overlap can be achieved by stepping the time forward for each data sample received. For this reason, a merging process is used to merge the similar sets of representations.

The final result is a compact set of representations, the model 111, that characterizes the important variability that is present in the time series training data.

For an accurate representation of a time window of multivariate time series data, the representation should ignore aspects of the data that are unimportant in comparing similar windows, but retain aspects of the data that are important in distinguising significantly different windows.

A collection of statistical distributions over time windows have this property for the types of multivariate time series encountered in practical equipment monitoring applications.

Testing Phase

Figure 3:
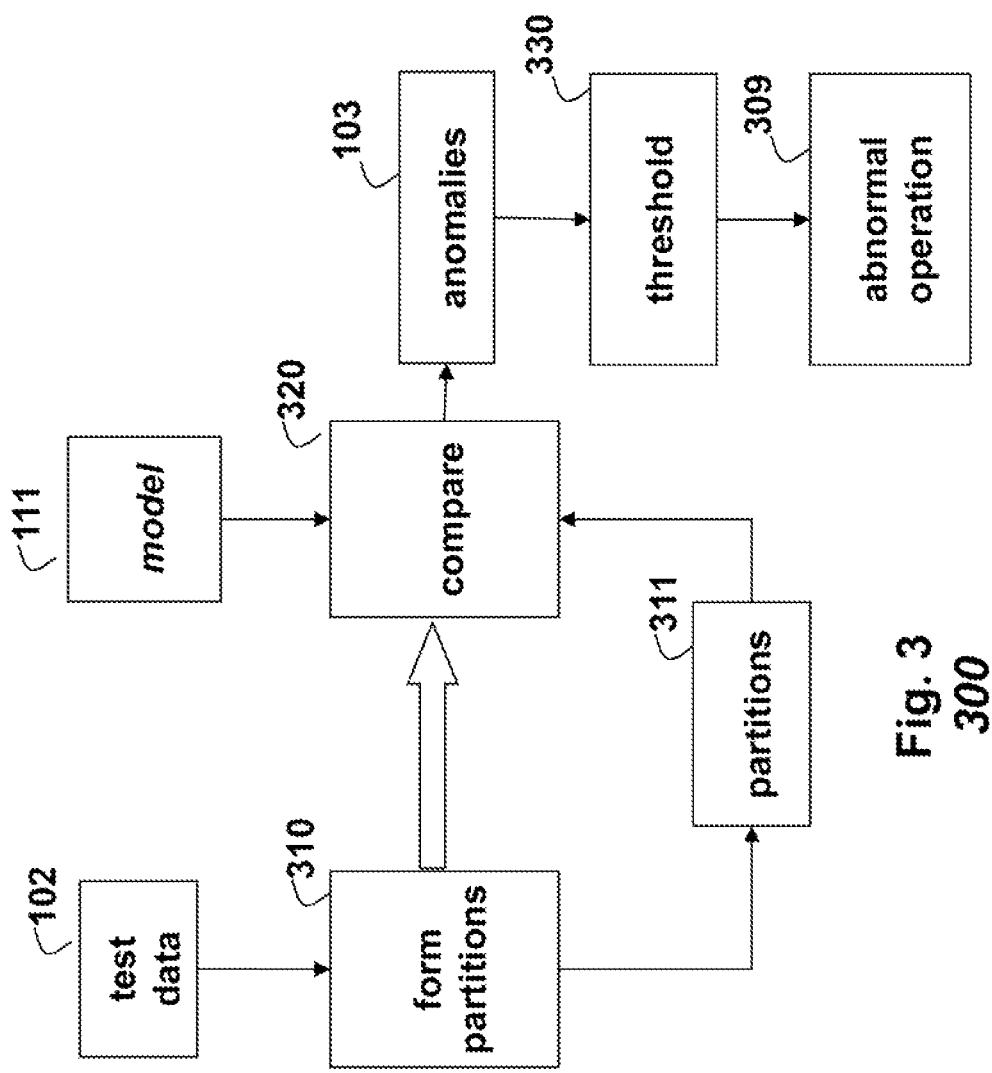
FIG. 3 is a flow diagram of a testing phase of the method of FIG. 1.

As shown in FIG. 3 for the testing phase 300, after constructing the model as a set of representations in the form of histograms, the multivariate time series test data can be compared to the model to detect the anomalies.

To do this, the same partitions 311 of the dimensions of the multivariate time series that we used for the training data are 310 used again for testing for the anomalies 103. Each partition is again treated independently. For each partition, the same sized sliding time window is passed over the test data.

The same set of representations used in the training phase are computed on each time window. The set of representations, typically stored as histograms, are compared 320 against the representations learned during the model construction phase 200. For the comparison, we can use, e.g., a chi-square distance.

The chi-square distance between two histograms is $$\mathrm{chi\_sq}(H1, H2) = \sum_i (H1(i) - H2(i))^2 / H2(i); \qquad (1)$$

where H1 and H2 are the histograms being compared, and i is an index over all of the bins in the histograms.

Various other methods of comparing distributions can also be used in place of chi-square, such as Student's t test, the Kolmogorov-Smirnov test, histogram intersection, KL divergence and Renyi divergence.

Each representation in the set yields the anomaly score for the time window. The set of anomaly scores can be combined to get a single anomaly score, or the scores can be kept separate to give more information about what variables triggered an anomaly detection. The anomaly scores can be thresholded 330 to detect abnormal operation 309 of equipment from which the time series data were acquired, e.g., an impending failure.

Effect Of The Invention

The invention provides a method for detecting anomalies in multivariate time series data acquired by sensors of equipment to monitoring equipment condition.

The goal is to monitor the equipment to automatically detect if the equipment has failed, or, perhaps, will soon fail.

Specifically, a method detects anomalies in time series data, wherein the time series data is multivariate, by partitioning time series training data into partitions.

A representation for each partition in each time window is determined to form a model of the time series training data, wherein the model includes representations of distributions of the time series training data. The representations obtained from partitions of time series test data are compared to the model to obtain anomaly scores.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting anomalies in time series data, wherein the time series data is multivariate, comprising the steps of:

partitioning, based on time, time series training data into partitions, wherein each partition is treated as a separate and independent multivariate time series, and processing each partition using a sliding time window;

determining a representation for each partition to form a model of the time series training data, wherein the model includes representations of distributions of the time series training data, wherein each distribution is a joint distribution over the time window of z(t), z(t+d) and an angle between the vectors (z(t), z(t+d)) and (z(t+d), z(t+2d)) for a single variable z(t) from the partition, where z is a variable of the partition and d is a delay; and comparing representations obtained from partitions of time series test data to the model to obtain anomaly scores, wherein the steps are performed in a processor.

2. The method of claim 1, wherein the time series data in the partitions have correlated dimensions.

3. The method of claim 1, wherein one or more of the distributions computed is a three-dimensional histogram representing the joint distribution over the time window of $z(t)$, $z(t+d)$ and an angle between the vectors $(z(t), z(t+d))$ and $(z(t+d), z(t+2d))$ for a single variable $z(t)$ from the partition.

4. The method of claim 1, wherein the comparing is done by computing a chi-square distance between a histogram computed over a current time window and a histogram computed from training data.

\* \* \* \* \*